(12) United States Patent
Kim et al.

(10) Patent No.: US 7,986,262 B2
(45) Date of Patent: Jul. 26, 2011

(54) RADAR TRACKING DEVICE AND METHOD THEREOF

(75) Inventors: Byung-Doo Kim, Deajeon (KR);
Seong-Yun Cho, Daejeon (KR);
Young-Su Cho, Seoul (KR); Wan-Sik Choi, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 39 days.

(21) Appl. No.: 12/443,419

(22) PCT Filed: Jun. 15, 2007

(86) PCT No.: PCT/KR2007/002899
§ 371 (c)(1),
(2), (4) Date: Dec. 10, 2009

(87) PCT Pub. No.: WO2008/038889
PCT Pub. Date: Apr. 3, 2008

(65) Prior Publication Data
US 2010/0103026 A1 Apr. 29, 2010

(30) Foreign Application Priority Data
Sep. 29, 2006 (KR) .................. 10-2006-0096459

(51) Int. Cl.
*G01S 13/00* (2006.01)
(52) U.S. Cl. ........................... 342/175; 342/77
(58) Field of Classification Search ............. 342/77, 342/175
See application file for complete search history.

(56) References Cited

U.S. PATENT DOCUMENTS
4,307,398 A 12/1981 Ward, Jr.
(Continued)

FOREIGN PATENT DOCUMENTS
JP 2001-242242 A 7/2001
(Continued)

OTHER PUBLICATIONS

International Search Report of International Application No. PCT/KR2008/003889 filed on Jun. 15, 2008.
(Continued)

*Primary Examiner* — Thomas H Tarcza
*Assistant Examiner* — Timothy A Brainard
(74) *Attorney, Agent, or Firm* — Kile Park Goekjian Reed & McManus PLLC (57) ABSTRACT

A radar tracking apparatus and method are provided. The radar tracking apparatus includes an $\alpha$-$\beta$ tracking filter, wherein the $\alpha$-$\beta$ tracking filter includes: a tracking index unit calculating a tracking index for obtaining $\alpha$ and $\beta$ filter gains of an $\alpha$-$\beta$ tracking filter, based on changes in the measurement error covariance of a radar-measured value that occur when the measured value of target is converted from a polar coordinate system to a rectangular coordinate system; and a filter gain update unit calculating the variations of $\alpha$ and $\beta$ filter gains, based on the partial differential coefficient of the changing rate of the $\alpha$ and $\beta$ filter gains with respect to the changing rate of the tracking index and the variations of the tracking index, and updating the $\alpha$ and $\beta$ filter gains.

8 Claims, 5 Drawing Sheets

U.S. PATENT DOCUMENTS

| | | | |
|---|---|---|---|
| 5,166,689 A * | 11/1992 | Pankow et al. | 342/77 |
| 5,168,277 A * | 12/1992 | LaPinta et al. | 342/77 |
| 5,387,917 A | 2/1995 | Hager et al. | |
| 5,914,683 A | 6/1999 | O'Conner | |
| 6,661,370 B2 | 12/2003 | Kishida et al. | |
| 6,704,692 B1 | 3/2004 | Banerjee et al. | |

FOREIGN PATENT DOCUMENTS

| | | |
|---|---|---|
| KR | P1994-0018672 A | 8/1994 |
| KR | 100155343 B1 | 7/1998 |

OTHER PUBLICATIONS

"The Tracking Index: A Generalized Parameter for alpha-beta and alpha-beta-gamma Target Trackers", Paul R. Kalata, IEEE Transactions on Aerospace and Electronic Systems, vol. AES-20, No. 2, Mar. 1984.

PCT Written Opinion of the International Search Authority for International Application No. PCT/KR2007/002899.

* cited by examiner

RADAR TRACKING DEVICE AND METHOD THEREOF

CROSS-REFERENCE TO RELATED PATENT APPLICATIONS

This application claims the benefit of Korean Patent Application No. 10-2006-0096459, filed on Sep. 29, 2006, in the Korean Intellectual Property Office, the disclosure of which is incorporated herein in its entirety by reference.

TECHNICAL FIELD

The present invention relates to a radar tracking apparatus and method, and more particularly, to a radar tracking apparatus and method updating an α-β gain by considering change in the characteristic of measured value errors. That is, the present invention relates to a radar tracking apparatus and method in which measurement error covariance is calculated from a radar-measured value converted to a rectangular coordinate system, and by using the covariance, the variations of a tracking index and an α-β gain are calculated and the α-β gain is updated.

BACKGROUND ART

Tracking apparatuses using radar have been used mainly for ports and large ships as well as for military purposes. In addition, the application fields of the tracking apparatuses have expanded recently to even include a field for avoiding car crashes.

The radar tracking apparatuses use α-β filters and Kalman filters, and in particular, the α-β filters are widely used for track-while-scan (TWS) tracking apparatuses that have to track tens or hundreds of targets at the same time.

The α-β filter requires much less computation than those of other tracking methods, and thus is appropriate for the TWS tracking apparatuses that have to track a plurality of targets in real-time. However, since the characteristic of measurement errors in a radar-measured value converted to a rectangular coordinate system varies with respect to the distance to and direction of a target, consideration of the characteristic is required in order to update an α-β gain.

DISCLOSURE OF INVENTION

Technical Problem

The present invention provides a radar tracking apparatus and method in which when tracking of an object is performed by using a radar-measured value, the gain of a tracking filter is updated by considering changes in the characteristic of errors in the radar-measured value, thereby providing improved performance.

Technical Solution

According to an aspect of the present invention, there is provided a radar tracking apparatus including an α-β tracking filter, wherein the α-β tracking filter includes: a tracking index unit calculating a tracking index for obtaining α and β filter gains of an α-β tracking filter, based on changes in the measurement error covariance of a radar-measured value that occur when the measured value of target is converted from a polar coordinate system to a rectangular coordinate system; and a filter gain update unit calculating the variations of α and β filter gains, based on the partial differential coefficient of the changing rate of the α and β filter gains with respect to the changing rate of the tracking index and the quantities of the changes of the tracking index and updating the α and β filter gains.

According to another aspect of the present invention, there is provided a radar tracking method using an α-β tracking filter, the method including: calculating a tracking index for obtaining α and β filter gains of an α-β tracking filter, based on changes in the measurement error covariance of a radar-measured value that occur when the measured value of target is converted from a polar coordinate system to a rectangular coordinate system; and calculating the variations of α and β filter gains, based on the partial differential coefficient of the changing rate of the α and β filter gains with respect to the changing rate of the tracking index and the quantities of the changes of the tracking index and updating the α and β filter gains.

Advantageous Effects

According to the present invention as described above, the gain of a tracking filter in a tracking apparatus using a radar-measured value is updated according to changes in the characteristic of a measurement error, thereby providing an improved tracking performance.

Accordingly, the present invention can be used in a variety of radar systems, including those for military purposes, those for guidance and control of navigation of ships in ports, and those for avoiding collisions of planes, ships and vehicles.

BEST MODE

According to an aspect of the present invention, there is provided a radar tracking apparatus including an α-β tracking filter, wherein the α-β tracking filter includes: a tracking index unit calculating a tracking index for obtaining α and β filter gains of an α-β tracking filter, based on changes in the measurement error covariance of a radar-measured value that occur when the measured value of target is converted from a polar coordinate system to a rectangular coordinate system; and a filter gain update unit calculating the variations of α and β filter gains, based on the partial differential coefficient of the changing rate of the α and β filter gains with respect to the changing rate of the tracking index and the quantities of the changes of the tracking index and updating the α and β filter gains.

According to another aspect of the present invention, there is provided a radar tracking method using an α-β tracking filter, the method including: calculating a tracking index for obtaining α and β filter gains of an α-β tracking filter, based on changes in the measurement error covariance of a radar-measured value that occur when the measured value of target is converted from a polar coordinate system to a rectangular coordinate system; and calculating the variations of α and β filter gains, based on the partial differential coefficient of the changing rate of the α and β filter gains with respect to the changing rate of the tracking index and the quantities of the changes of the tracking index and updating the α and β filter gains.

MODE FOR INVENTION

The present invention will now be described more fully with reference to the accompanying drawings, in which exemplary embodiments of the invention are shown.

Figure 1:
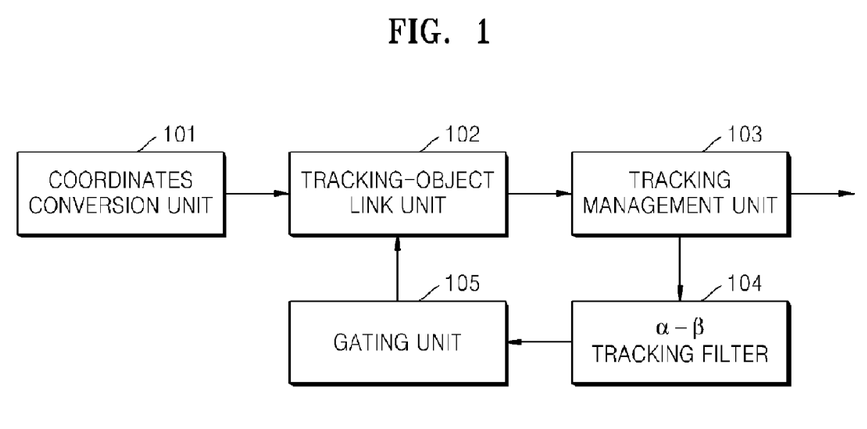
FIG. 1 is a block diagram illustrating a radar tracking apparatus according to an embodiment of the present invention.

FIG. 1 is a block diagram illustrating a radar tracking apparatus according to an embodiment of the present invention.

Referring to FIG. 1, the radar tracking apparatus according to the current embodiment is composed of a coordinate conversion unit 101, a tracking-object link unit 102, a tracking management unit 103, an α-β tracking filter 104, and a gating unit 105.

The coordinate conversion unit 101 converts the position of an object observed in a polar coordinate system, into a position on a rectangular coordinate system. Since a radar-observed value is obtained on a polar coordinate system, conversion of the value into a coordinate system the same as the coordinate system (in this case, a rectangular coordinate system) used in a tracking filter is necessary.

The tracking-object link unit 102 links a target and an object having a minimum square of a distance error. The object is an object extracted from a scanned image. Generally, an 'object' is a military term that indicates an unconfirmed object detected by radar.

A 'target' is an object of interest worth tracking among objects. Targets mainly indicate vessels or planes of friendly forces in operation, fishing ships, or objects that are expected to be a threat.

By tracking a target, the current position and navigation direction of the target can be learned. By using this information, guidance for smoother operation of the friendly forces can be provided, or it can be determined whether or not a fishing ship crosses over a military demarcation line, whether or not a fishing ship goes or may go beyond a permitted fishing area.

That is, ships can be provided with guidance, and in an area where a plurality of ships are crowded, tracking information is used for an automatic radar plotting aids (ARPA) function that is used for avoiding collisions.

The tracking management unit 103 generates tracking data of a newly detected object, and manages maintenance and deletion of tracking data not linked to an object.

The α-β tracking filter 104 performs updating and prediction of tracking data with respect to tracking data linked to the object. The α-β tracking filter 104 performs tracking prediction in order to provide a predicted position of an object being tracked.

The gating unit 105 sets a boundary for linking the position of a predicted target and an object observed by radar.

Figure 2:
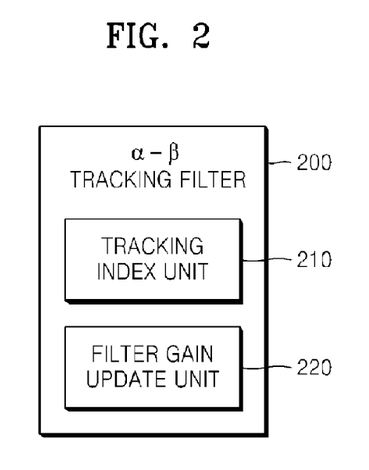
FIG. 2 is a block diagram illustrating a tracking filter unit used in a radar tracking apparatus according to an embodiment of the present invention.

FIG. 2 is a block diagram illustrating a tracking filter unit used in a radar tracking apparatus according to an embodiment of the present invention.

Referring to FIG. 2, the α-β tracking filter 200 used in a radar tracking apparatus according to the current embodiment is composed of a tracking index unit 210 and a filter gain update unit 220.

The tracking index unit 210 calculates a tracking index for obtaining α and β filter gains of an α-β tracking filter, based on changes in the measurement error covariance of a radar-measured value that occur when the measured value of target is converted from a polar coordinate system to a rectangular coordinate system.

In the tracking index unit 210, the changes in the measurement error covariance of the radar-measured value is expressed based on a function of the standard deviation of a radar measurement error. This will now be explained in more detail.

The α-β tracking filter 200 calculates the measurement error covariance from the position information of an object observed by radar.

First, the motion and observation model of an optimum α-β tracking filter will be explained. A motion model of a target with state variables of a position and a speed at a discrete time can be expressed as equation 1 below.

$$\begin{bmatrix} x_{k+1} \\ \dot{x}_{k+1} \end{bmatrix} = \begin{bmatrix} 1 & T \\ 0 & 1 \end{bmatrix} \begin{bmatrix} x_k \\ \dot{x}_k \end{bmatrix} + \begin{bmatrix} T^2/2 \\ T \end{bmatrix} v_k \qquad (1)$$

Here, it is assumed that $x_k$ is the position of the target at a time k, $\dot{x}_k$ is the speed of the target, T is a discrete interval, and $v_k$ is white Gaussian noise in which the mean is 0 and the dispersion is $\sigma_v^2$.

A measurement equation with respect to the position of a target observed at an interval of T seconds can be expressed as equation 2 below.

$$z_k = [1 \ 0]\begin{bmatrix} x_k \\ \dot{x}_k \end{bmatrix} + w_k \qquad (2)$$

Here, it is assumed that
$w_k$
is white Gaussian noise in which the mean is 0 and the dispersion is
$\sigma_v^2$.

A prediction formula and an improved formula of the α-β tracking filter can be expressed as equations 3 and 4, respectively, below.

$$\begin{bmatrix} \tilde{x}_k^- \\ \tilde{\dot{x}}_k^- \end{bmatrix} = \begin{bmatrix} 1 & T \\ 0 & 1 \end{bmatrix} \begin{bmatrix} \tilde{x}_{k-1}^+ \\ \tilde{\dot{x}}_{k-1}^+ \end{bmatrix} \qquad (3)$$

$$\begin{bmatrix} \tilde{x}_k^+ \\ \tilde{\dot{x}}_k^+ \end{bmatrix} = \begin{bmatrix} \tilde{x}_k^- \\ \tilde{\dot{x}}_k^- \end{bmatrix} + \begin{bmatrix} \alpha \\ \beta/T \end{bmatrix} [z_k - \tilde{x}_k^-] \qquad (4)$$

Here,
$\tilde{x}_k^-$ and $\tilde{\dot{x}}_k^-$ are the estimated position and speed value, respectively, of the target, $\hat{x}_k^+$ and $\hat{\dot{x}}_k^+$ are the updated estimated position and speed values, respectively, $z_k$ is a radar-measured value, and $\alpha$ and $\beta$ are gains of the tracking filter.

A method of selection an optimum $\alpha$-$\beta$ gain has been suggested by Kalata.

$\lambda$, which is known as a tracking index, is a function of the standard deviation of a process error and the standard deviation of a radar measurement error of the motion model of a target and is defined as equation 5 below.

$$\lambda = \frac{\sigma_v}{\sigma_\omega} T^2 \quad (5)$$

An optimum $\alpha$-$\beta$ gain can be obtained from a tracking index as equations 6 and 7 below.

$$\alpha = -\frac{1}{8}(\lambda^2 + 8\lambda - (\lambda+4)\sqrt{\lambda^2 + 8\lambda}) \quad (6)$$

$$\beta = -\frac{1}{4}(\lambda^2 + 4\lambda - \lambda\sqrt{\lambda^2 + 8\lambda}) \quad (7)$$

Accordingly, the gain matrix of the $\alpha$-$\beta$ tracking filter can be expressed as equation 8 below.

$$K = \begin{bmatrix} \alpha \\ \beta/T \end{bmatrix} \quad (8)$$

Also, a gain matrix of a separation-type tracking filter designed in a rectangular coordinate system using the converted measured value can be expressed as equation 9 below after dividing a distance and an azimuth.

$$K_k = D_2 K_2 D^T \quad (9)$$

Here, D and $D_2$ are expressed as equations 10 and 11, respectively, below.

$$D = \begin{bmatrix} \cos\theta_k & -\sin\theta_k \\ \sin\theta_k & \cos\theta_k \end{bmatrix} \quad (10)$$

$$D_2 = \begin{bmatrix} D & 0_{2\times 2} \\ 0_{2\times 2} & D \end{bmatrix} \quad (11)$$

Above,
$K_2$
is a gain matrix obtained by expanding the gain matrix of equation 8 into a 2-dimensional (2D) rectangular coordinate system, and D is a transformation matrix with respect to an arbitrary azimuth angle
$\theta_k$.

The covariance matrix of a measurement error in a radar-measured value converted into a rectangular coordinate system by using modified unbiased converted measurements (MUCM) can be expressed as equation 12 below.

$$R = \begin{bmatrix} \sigma_x^2 & \sigma_{xy}^2 \\ \sigma_{xy}^2 & \sigma_y^2 \end{bmatrix} = D R_m D^T \quad (12)$$

where, $$R_m = \begin{bmatrix} \pi_1 + \pi_2(1 + \lambda_\theta') & 0 \\ 0 & \pi_2(1 - \lambda_\theta') \end{bmatrix} \quad (13)$$

$$\pi_1 = -\lambda_\theta^2 r_k^2 \quad (14)$$

$$\pi_2 = \frac{1}{2}(r_k^2 + \sigma_r^2) \quad (15)$$

$$\lambda_\theta' = E\{\cos 2\nu_\theta\} = e^{-2\sigma_\theta^2} \quad (16)$$

$$\lambda_\theta = E\{\cos\nu_\theta\} = e^{-\sigma_\theta^2/2} \quad (17)$$

Above,
$r_k$
is a measured value of the distance to a target,
$\sigma_r^2$
is the covariance with respect to distance error,
$\nu_\theta$
is an azimuth angle measurement noise that is white Gaussian noise in which the mean is 0 and the dispersion is
$\sigma_\theta^2$.

As illustrated in equations 12 and 13, the measurement error covariance with respect to the x-axis and y-axis varies depending on the distance to the target, and thus, the already calculated tracking index and $\alpha$-$\beta$ gain may become inappropriate, thereby lowering the tracking performance. Accordingly, updating of the gain of a tracking filter should be performed in consideration of this.

So far, the covariance matrix of a measurement error in a radar-measured value converted into a rectangular coordinate system by using the MUCM has been described above.

However, the conversion method is not limited to the MUCM, and even if the conversion is performed using another method, including a classical conversion, a debiased conversion, and an unbiased conversion, the measurement error covariance of the measured value converted into a rectangular coordinate system will change.

Next, the changed quantity of a tracking index is calculated. In this case, the changed quantity of the tracking index is calculated in order to perform approximate updating of an $\alpha$-$\beta$ gain.

First, by considering changes in the measurement error covariance with respect to the x-axis and y-axis, equation 5 can be expressed as equation 18 below.

$$\lambda_k = \frac{\sigma_v}{\sigma_{w,k}} T^2 \quad (18)$$

Here,
$\sigma_{w,k}$ is the standard deviation of a measurement error at k-th scan.

The filter gain update unit 220 calculates the variations of the $\alpha$ and $\beta$ filter gains, based on the partial differential coefficient of the changing rate of the $\alpha$ and $\beta$ filter gains with respect to the changing rate of the tracking index and the changed quantities of the tracking index, and updates the $\alpha$ and $\beta$ filter gains.

By using the partial differential coefficient at the tracking index, $\delta\alpha$ and $\delta\beta$ are calculated. The changing rate of the $\alpha$-$\beta$ gain with respect to the changing rate of the tracking index can be expressed as equations 19 and 20 below.

$$\frac{\partial \alpha_k}{\partial t} = \frac{\partial \alpha_k}{\partial \lambda_k}\frac{\partial \lambda_k}{\partial t} \quad (19)$$

$$\frac{\partial \beta_k}{\partial t} = \frac{\partial \beta_k}{\partial \lambda_k}\frac{\partial \lambda_k}{\partial t} \quad (20)$$

Partial differential equations of the α-β gain with respect to the tracking index as equations 21 and 22 below can be derived from equations 6 and 7.

$$\frac{\partial \alpha_k}{\partial \lambda_k} = -\frac{1}{4}\left(\lambda_k + 4 - \frac{\lambda_k^2 + 8\lambda_k + 8}{\sqrt{\lambda_k^2 + 8\lambda_k}}\right) \quad (21)$$

$$\frac{\partial \beta_k}{\partial \lambda_k} = \frac{1}{2}\left(\lambda_k + 2 - \frac{\lambda_k^2 + 6\lambda_k}{\sqrt{\lambda_k^2 + 8\lambda_k}}\right) \quad (22)$$

The tracking index between the k-th scan and the (k+1)-th scan and the changed quantity of the α-β gain can be expressed as equations 23 through 25 below.

$$\Delta\lambda = \lambda_{k+1} - \lambda_k \quad (23)$$

$$\Delta\alpha = \alpha_{k+1} - \alpha_k = T\frac{\partial \alpha_k}{\partial t} \quad (24)$$

$$\Delta\beta = \beta_{k+1} - \beta_k = T\frac{\partial \beta_k}{\partial t} \quad (25)$$

From equations 19 through 25, the changed quantity of the α-β gain is expressed as equations 26 and 27 below.

$$\partial\alpha = -\frac{1}{4}\left(\lambda_k + 4 - \frac{\lambda_k^2 + 8\lambda_k + 8}{\sqrt{\lambda_k^2 + 8\lambda_k}}\right)\Delta\lambda \quad (26)$$

$$\partial\beta = \frac{1}{2}\left(\lambda_k + 2 - \frac{\lambda_k^2 + 6\lambda_k}{\sqrt{\lambda_k^2 + 8\lambda_k}}\right)\Delta\lambda \quad (27)$$

Accordingly, the α-β gain updated by using the changed quantity of the tracking index with respect to a nominal point at the (k+1)-th update period, and the changed quantity of the α-β gain can be expressed as equations 28 through 30 below.

$$\Delta\lambda = \lambda_{k+1} - \lambda \quad (28)$$

$$\alpha_{k+1} = \alpha + \Delta\alpha \quad (29)$$

$$\beta_{k+1} = \beta + \Delta\beta \quad (30)$$

Also, the gain matrix of the α-β tracking filter can be given as equation 31 below.

$$K_{k+1} = \begin{bmatrix} \alpha_{k+1} \\ \beta_{k+1}/T \end{bmatrix} \quad (31)$$

The process of calculating the gain of the tracking filter illustrated in equations 18 through 31 can be simplified as equations 26 and 27 below, assuming that the partial differential of the α-β gain with respect to the tracking index is a constant.

$$\Delta\alpha = m_\alpha \Delta\lambda \quad (32)$$

$$\Delta\beta = m_\alpha \Delta\lambda \quad (33)$$

Here,
$m_\alpha$
and
$m_\beta$
and values of
∂α/∂t
and
∂β/∂t,
respectively, with respect to an optimum tracking index
λ
and can be calculated as equations 34 and 35 below.

$$m_a = -\frac{1}{4}\left(\lambda + 4 - \frac{\lambda^2 + 8\lambda + 8}{\sqrt{\lambda^2 + 8\lambda}}\right) \quad (34)$$

$$m_\beta = \frac{1}{2}\left(\lambda + 2 - \frac{\lambda^2 + 6\lambda}{\sqrt{\lambda^2 + 8\lambda}}\right) \quad (35)$$

Since
$m_\alpha$
and
$m_\beta$
can be calculated in advance, additional calculations can be minimized. In this way, the amount of change α-β gain with respect to the changed quantity ($\Delta\lambda$) of the tracking index can be easily calculated by using the first order partial differential coefficients ($m_\alpha$, $m_\beta$) at the nominal tracking index.

By using the calculated changed quantity of the α-β gain, the α-β gain is updated. The update of the α-β gain by using the calculated changed quantity of the α-β gain will now be explained. Also, by using the updated α-β gain, the tracking data is updated.

Figure 3:
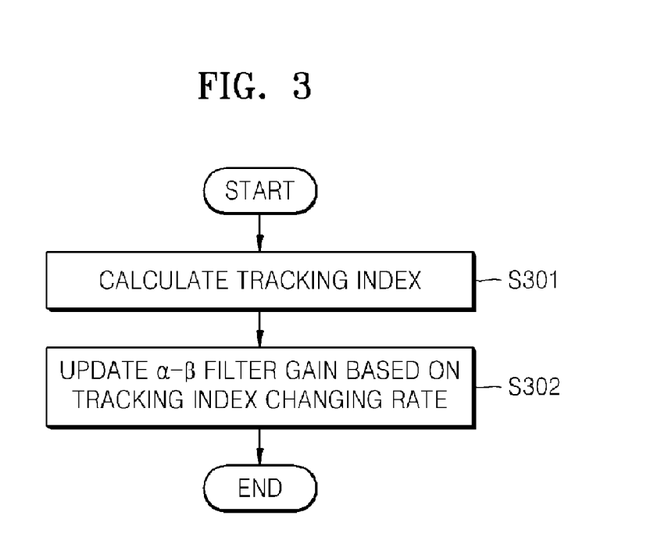
FIG. 3 is a flowchart of a radar tracking method according to an embodiment of the present invention.

FIG. 3 is a flowchart of a radar tracking method according to an embodiment of the present invention. Referring to FIG. 3, the radar tracking method using an α-β tracking filter includes calculation of a tracking index in operation S301 and updating of a filter gain in operation S302.

In the calculation of the tracking index in operation S301, a tracking index for obtaining α and β filter gains of an α-β tracking filter is calculated based on changes in the measurement error covariance of a radar-measured value that occur when the measured value of target is converted from a polar coordinate system to a rectangular coordinate system.

In the calculation of the tracking index in operation S301, the in the measurement error covariance of the radar-measured value can be expressed based on a function of the standard deviation of the radar measurement error.

In the update of the filter gain in operation S302, the variations of the α and β filter gains are calculated based on the partial differential coefficient of the changing rate of the α and β filter gains with respect to the changing rate of the tracking index and the changed quantities of the tracking index and the α and β filter gains are updated.

Figure 4:
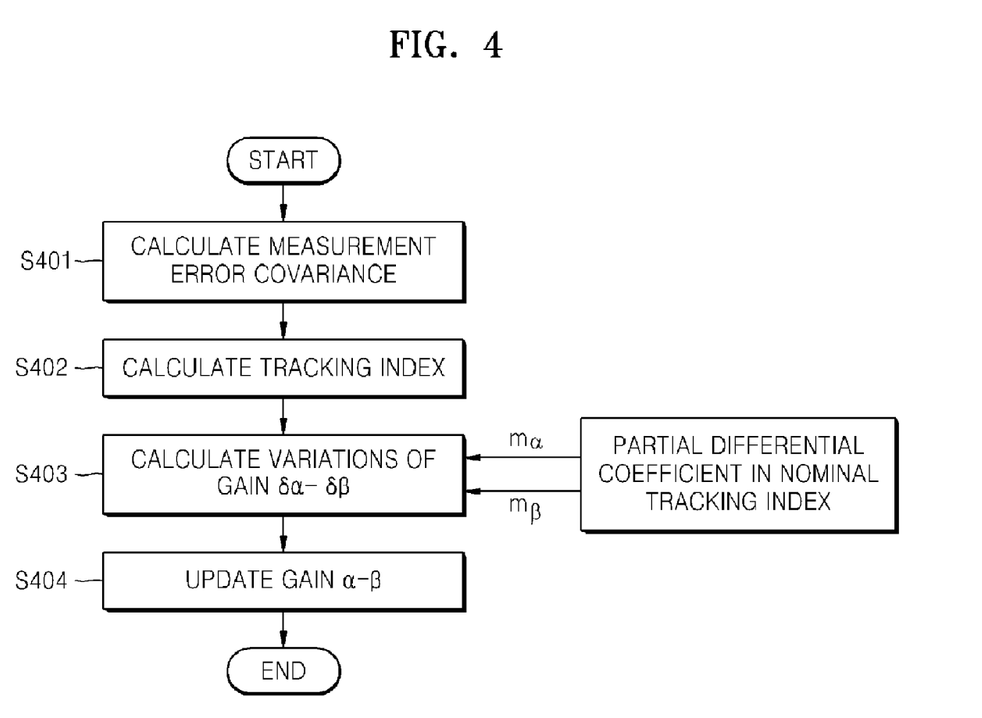
FIG. 4 is a flowchart of a radar tracking method according to another embodiment of the present invention.

FIG. 4 is a flowchart of a method of updating the gain of a tracking filter in consideration of changes in the characteristic of a measurement value error in a radar tracking method according to another embodiment of the present invention.

An α-β tracking filter calculates the measurement error covariance from the position information of an object observed by radar.

First, the motion and observation model of an optimum α-β tracking filter will be explained. A motion model of a target with state variables of a position and a speed at a discrete time can be expressed as equation 1 below.

$$\begin{bmatrix} x_{k+1} \\ \dot{x}_{k+1} \end{bmatrix} = \begin{bmatrix} 1 & T \\ 0 & 1 \end{bmatrix} \begin{bmatrix} x_k \\ \dot{x}_k \end{bmatrix} + \begin{bmatrix} T^2/2 \\ T \end{bmatrix} \quad (1)$$

Here, it is assumed that
$x_k$
is the position of the target at a time k,
$\dot{x}_k$
is the speed of the target, T is a discrete interval, and
$v_k$
is white Gaussian noise in which the mean is 0 and the dispersion is
$\sigma_v^2$.

A measurement equation with respect to the position of a target observed at intervals of T seconds can be expressed as equation 2 below.

$$z_k = \begin{bmatrix} 1 & 0 \end{bmatrix} \begin{bmatrix} x_k \\ \dot{x}_k \end{bmatrix} + w_k \quad (2)$$

Here, it is assumed that
$w_k$ is white Gaussian noise in which the mean is 0 and the dispersion is
$\sigma_v^2$.

A prediction formula and an improved formula of the α-β tracking filter can be expressed as equations 3 and 4, respectively, below.

$$\begin{bmatrix} \tilde{x}_k^- \\ \tilde{\dot{x}}_k^- \end{bmatrix} = \begin{bmatrix} 1 & T \\ 0 & 1 \end{bmatrix} \begin{bmatrix} \tilde{x}_{k-1}^+ \\ \tilde{\dot{x}}_{k-1}^+ \end{bmatrix} \quad (3)$$

$$\begin{bmatrix} \tilde{x}_k^+ \\ \tilde{\dot{x}}_k^+ \end{bmatrix} = \begin{bmatrix} \tilde{x}_k^- \\ \tilde{\dot{x}}_k^- \end{bmatrix} + \begin{bmatrix} \alpha \\ \beta/T \end{bmatrix} [z_k - \tilde{x}_k^-] \quad (4)$$

Here,
$\tilde{x}_k^-$ and $\tilde{\dot{x}}_k^-$ are the estimated position and speed value, respectively, of the target,
$\tilde{x}_k^+$
and
$\tilde{\dot{x}}_k^+$
are the updated estimated position and speed values, respectively, $z_k$ is a radar-measured value, and α and β are gains of the tracking filter.

A method of selection an optimum α-β gain has been suggested by Kalata. λ, which is known as a tracking index, is a function of the standard deviation of a process error and the standard deviation of a radar measurement error of the motion model of a target and is defined as equation 5 below.

$$\lambda = \frac{\sigma_v}{\sigma_\omega} T^2 \quad (5)$$

An optimum α-β gain can be obtained from a tracking index as equations 6 and 7 below.

$$\alpha = -\frac{1}{8}(\lambda^2 + 8\lambda - (\lambda+4)\sqrt{\lambda^2 + 8\lambda}) \quad (6)$$

$$\beta = -\frac{1}{4}(\lambda^2 + 4\lambda - \lambda\sqrt{\lambda^2 + 8\lambda}). \quad (7)$$

Accordingly, the gain matrix of the α-β tracking filter can be expressed as equation 8 below.

$$K = \begin{bmatrix} \alpha \\ \beta/T \end{bmatrix} \quad (8)$$

Also, a gain matrix of a separation-type tracking filter designed, in a rectangular coordinate system using the converted measured value can be expressed as equation 9 below after dividing a distance and an azimuth.

$$K_k = D_2 K_2 D^T \quad (9)$$

Here, D and $D_2$ are expressed as equations 10 and 11, respectively, below.

$$D = \begin{bmatrix} \cos\theta_k & -\sin\theta_k \\ \sin\theta_k & \cos\theta_k \end{bmatrix} \quad (10)$$

$$D_2 = \begin{bmatrix} D & 0_{2\times 2} \\ 0_{2\times 2} & D \end{bmatrix} \quad (11)$$

Above,
$K_2$
is a gain matrix obtained by expanding the gain matrix of equation 8 into a 2-dimensional (2D) rectangular coordinate system, and D is a transformation matrix with respect to an arbitrary azimuth angle
$\theta_k$.

The covariance matrix of a measurement error in a radar-measured value converted into a rectangular coordinate system by using MUCM can be expressed as equation 12 below.

$$R = \begin{bmatrix} \sigma_x^2 & \sigma_{xy}^2 \\ \sigma_{xy}^2 & \sigma_y^2 \end{bmatrix} = DR_m D^T \quad (12)$$

where, $$R_m = \begin{bmatrix} \pi_1 + \pi_2(1 + \lambda_\theta') & 0 \\ 0 & \pi_2(1 - \lambda_\theta') \end{bmatrix} \quad (13)$$

$$\pi_1 = -\lambda_\theta^2 r_k^2 \quad (14)$$

$$\pi_2 = \frac{1}{2}(r_k^2 + \sigma_r^2) \quad (15)$$

$$\lambda_\theta' = E\{\cos 2v_\theta\} = e^{-2\sigma_\theta^2} \quad (16)$$

$$\lambda_\theta = E\{\cos v_\theta\} = e^{-\sigma_\theta^2/2} \quad (17)$$

Above,
$r_k$
is a measured value of the distance to a target,
$\sigma_r^2$
is the covariance with respect to distance error,
$v_\theta$
is an azimuth angle measurement noise that is white Gaussian noise in which the mean is 0 and the dispersion is
$\sigma_\theta^2$.

As illustrated in equations 12 and 13, the measurement error covariance with
respect to the x-axis and y-axis varies depending on the distance to the target, and thus, the already calculated tracking index and $\alpha$-$\beta$ gain may become inappropriate, thereby lowering the tracking performance. Accordingly, updating of the gain of a tracking filter should be performed in consideration of this.

So far, the covariance matrix of a measurement error in a radar-measured value converted into a rectangular coordinate system by using the MUCM has been described above.

However, the conversion method is not limited to the MUCM, and even if the conversion is performed using another method, including a classical conversion, a debiased conversion, and an unbiased conversion, the measurement error covariance of the measured value converted into a rectangular coordinate system will change.

Next, the changed quantity of a tracking index is calculated in operation S402. In this case, the changed quantity of the tracking index is calculated in order to perform approximate updating of an $\alpha$-$\beta$ gain.

First, by considering changes in the measurement error covariance with respect to the x-axis and y-axis, equation 5 can be expressed as equation 18 below.

$$\lambda_k = \frac{\sigma_v}{\sigma_{w,k}} T^2 \quad (18)$$

Here,
$\sigma_{w,k}$ is the standard deviation of a measurement error at k-th scan.

By using the partial differential coefficient at the tracking index, $\delta\alpha$ and $\delta\beta$ are calculated in operation S403. The changing rate of the $\alpha$-$\beta$ gain with respect to the changing rate of the tracking index can be expressed as equations 19 and 20 below.

$$\frac{\partial \alpha_k}{\partial t} = \frac{\partial \alpha_k}{\partial \lambda_k} \frac{\partial \lambda_k}{\partial t} \quad (19)$$

$$\frac{\partial \beta_k}{\partial t} = \frac{\partial \beta_k}{\partial \lambda_k} \frac{\partial \lambda_k}{\partial t} \quad (20)$$

Partial differential equations of the $\alpha$-$\beta$ gain with respect to the tracking index as equations 21 and 22 below can be derived from equations 6 and 7.

$$\frac{\partial \alpha_k}{\partial \lambda_k} = -\frac{1}{4}\left(\lambda_k + 4 - \frac{\lambda_k^2 + 8\lambda_k + 8}{\sqrt{\lambda_k^2 + 8\lambda_k}}\right) \quad (21)$$

$$\frac{\partial \beta_k}{\partial \lambda_k} = \frac{1}{2}\left(\lambda_k + 2 - \frac{\lambda_k^2 + 6\lambda_k}{\sqrt{\lambda_k^2 + 8\lambda_k}}\right) \quad (22)$$

The tracking index between the k-th scan and the (k+1)-th scan and the changed quantity of the $\alpha$-$\beta$ gain can be expressed as equations 23 through 25 below.

$$\Delta\lambda = \lambda_{k+1} - \lambda_k \quad (23)$$

$$\Delta\alpha = \alpha_{k+1} - \alpha_k = T\frac{\partial \alpha_k}{\partial t} \quad (24)$$

$$\Delta\beta = \beta_{k+1} - \beta_k = T\frac{\partial \beta_k}{\partial t} \quad (25)$$

From equations 19 through 25, the changed quantity of the $\alpha$-$\beta$ gain is expressed as
equations 26 and 27 below.

$$\Delta\alpha = -\frac{1}{4}\left(\lambda_k + 4 - \frac{\lambda_k^2 + 8\lambda_k + 8}{\sqrt{\lambda_k^2 + 8\lambda_k}}\right)\Delta\lambda \quad (26)$$

$$\Delta\beta = \frac{1}{2}\left(\lambda_k + 2 - \frac{\lambda_k^2 + 6\lambda_k}{\sqrt{\lambda_k^2 + 8\lambda_k}}\right)\Delta\lambda \quad (27)$$

Accordingly, the $\alpha$-$\beta$ gain updated by using the changed quantity of the tracking index with respect to a nominal point at the (k+1)-th update period, and the changed quantity of the $\alpha$-$\beta$ gain can be expressed as equations 28 through 30 below, $$\Delta\lambda = \lambda_{k+1} - \lambda \quad (28)$$

$$\alpha_{k+1} = \alpha + \Delta\alpha \quad (29)$$

$$\beta_{k+1} = \beta + \Delta\beta \quad (30)$$

Also, the gain matrix of the $\alpha$-$\beta$ tracking filter can be given as equation 31 below.

$$K_{k+1} = \begin{bmatrix} \alpha_{k+1} \\ \beta_{k+1}/T \end{bmatrix} \quad (31)$$

The process of calculating the gain of the tracking filter illustrated in equations 18 through 31 can be simplified as equations 26 and 27 below, assuming that the partial differential of the $\alpha$-$\beta$ gain with respect to the tracking index is a constant.

$$\Delta\alpha = m_\alpha \Delta\lambda \quad (32)$$

$$\Delta\beta = m_\beta \Delta\lambda \quad (33)$$

Here,
$m_\alpha$
And
$m_\beta$
and values of
$\partial\alpha/\partial t$
and
$\partial\beta/\partial t$,
respectively, with respect to an optimum tracking index
$\lambda$
and can be calculated as equations 34 and 35 below.

$$m_\alpha = \frac{1}{4}\left(\lambda + 4 - \frac{\lambda^2 + 8\lambda + 8}{\sqrt{\lambda^2 + 8\lambda}}\right) \quad (34)$$

-continued $$m_\beta = \frac{1}{2}\left(\lambda + 2 - \frac{\lambda^2 + 6\lambda}{\sqrt{\lambda^2 + 8\lambda}}\right) \quad (35)$$

Since $m_\alpha$ and $m_\beta$ can be calculated in advance, additional calculations can be minimized. In this way, the amount of change α-β gain with respect to the changed quantity (Δλ)

of the tracking index can be easily calculated by using the first order partial differential coefficients ($m_\alpha$, $m_\beta$) at the nominal tracking index.

By using the calculated changed quantity of the α-β gain, the α-β gain is updated in operation S404. Also, by using the updated α-β gain, the tracking data is updated.

Figure 5:
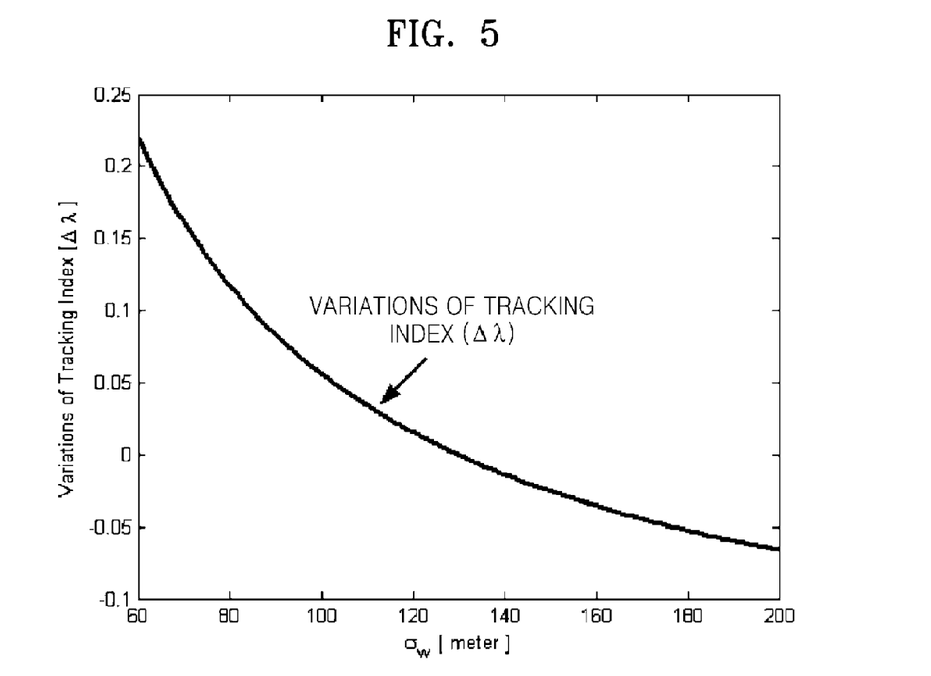
FIG. 5 is a graph illustrating changes in a tracking index with respect to a characteristic of a radar measurement error according to an embodiment of the present invention.

FIG. 5 is a graph illustrating changes in a tracking index with respect to the characteristic of a radar measurement error according to an embodiment of the present invention. That is, FIG. 5 illustrates the changes in the tracking index with respect to changes in the observation error covariance.

A uniform motion model is used as a motion model of a target, and the standard deviation of a process error is set to 0.98 m/s². A radar-measured value is generated by assuming white noise has a mean of 0 and the standard deviation is 50 m in distance and 1 degree in azimuth. Also, the update period is set to 5 seconds, that is, the rotation rate of an antenna is set to 12 revolutions per minute (rpm).

Figure 6:
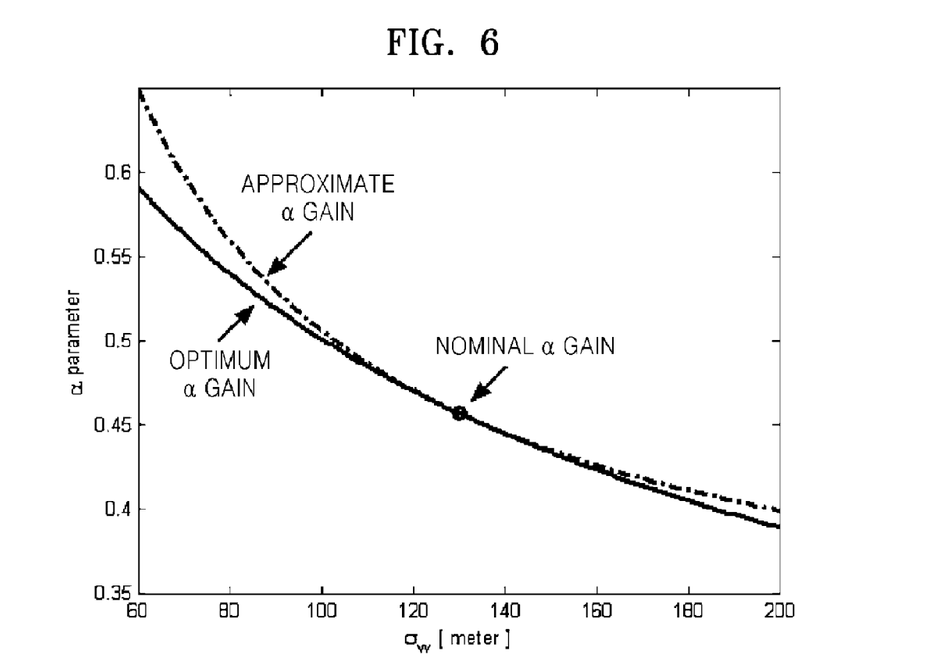
FIG. 6 is a graph illustrating an updated α gain parameter according to an embodiment of the present invention.

FIG. 6 is a graph illustrating an updated α gain parameter according to an
embodiment of the present invention. Referring to FIG. 6, a nominal α gain parameter according to the conventional method, an updated α gain parameter and an optimum α gain parameter according to an embodiment of the present invention are shown.

FIG. 6 shows an α gain calculated by using an optimum tracking index and an α gain calculated by using an approximation method. The latter method is used in the α-β filter according to an embodiment of the present invention.

The circle indicates an optimum α gain at a nominal point. As a motion model of a target, a uniform motion model is used, and the standard deviation of a process error is set to 0.98 m/s². A radar-measured value is generated by assuming white noise has a mean of 0 and the standard deviation is 50 m in distance and 1 degree in azimuth. Also, the update period is set to 5 seconds, that is, the rotation rate of an antenna is set to 12 rpm.

The distance of the target is set to so that the standard deviation of a measurement error with respect to the y-axis varies in a range of 130 m±70 m. By using equation 34 and 35 with respect to an optimum tracking index, $m_\alpha$ and $m_\beta$ are calculated, and by using equation 32 and 33, the α-β gain updated.

Figure 7:
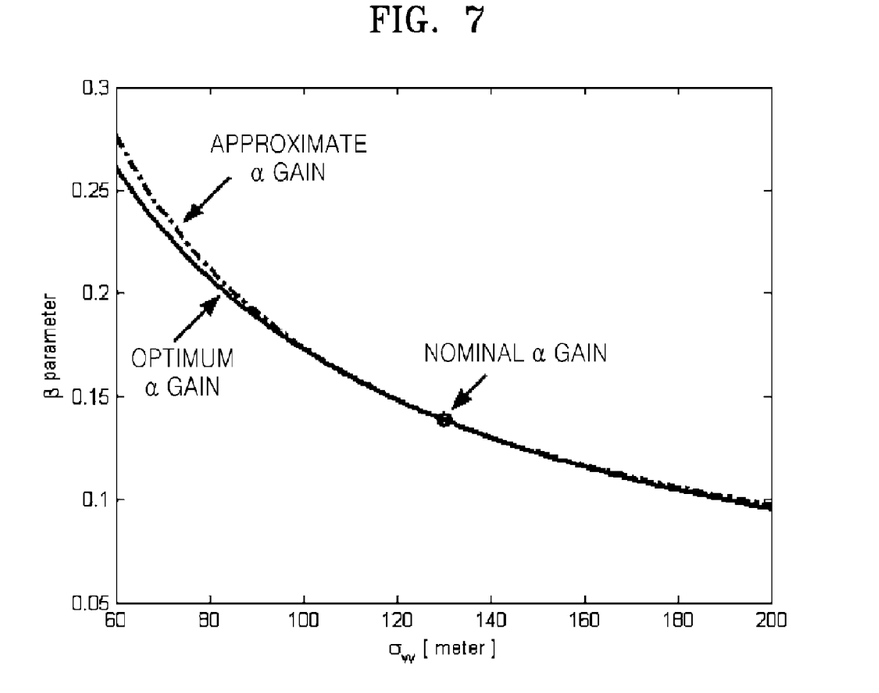
FIG. 7 is a graph illustrating an updated β gain parameter according to an embodiment of the present invention.

FIG. 7 is a graph illustrating an updated β gain parameter according to an embodiment of the present invention. Referring to FIG. 7, a nominal β gain parameter according to the conventional method, an updated β gain parameter and an optimum β gain parameter according to an embodiment of the present invention are shown.

FIG. 7 shows a β gain calculated by using an optimum tracking index and a β gain calculated by using an approximation method. The latter method is used in the α-β filter according to an embodiment of the present invention.

The circle indicates an optimum β gain at a nominal point. As a motion model of a target, a uniform motion model is used, and the standard deviation of a process error is set to 0.98 m/s². A radar-measured value is generated by assuming white noise has a mean of 0 and the standard deviation is 50 m in distance and 1 degree in azimuth. Also, the update period is set to 5 seconds, that is, the rotation rate of an antenna is set to 12 rpm.

The distance of the target is set so that the standard deviation of a measurement
error with respect to the y-axis varies in a range of 130 m±70 m. By using equations 34 and 35 with respect to an optimum tracking index, $m_\alpha$ and $m_\beta$ are calculated, and by using equations 32 and 33, the α-β gain updated.

Figure 8:
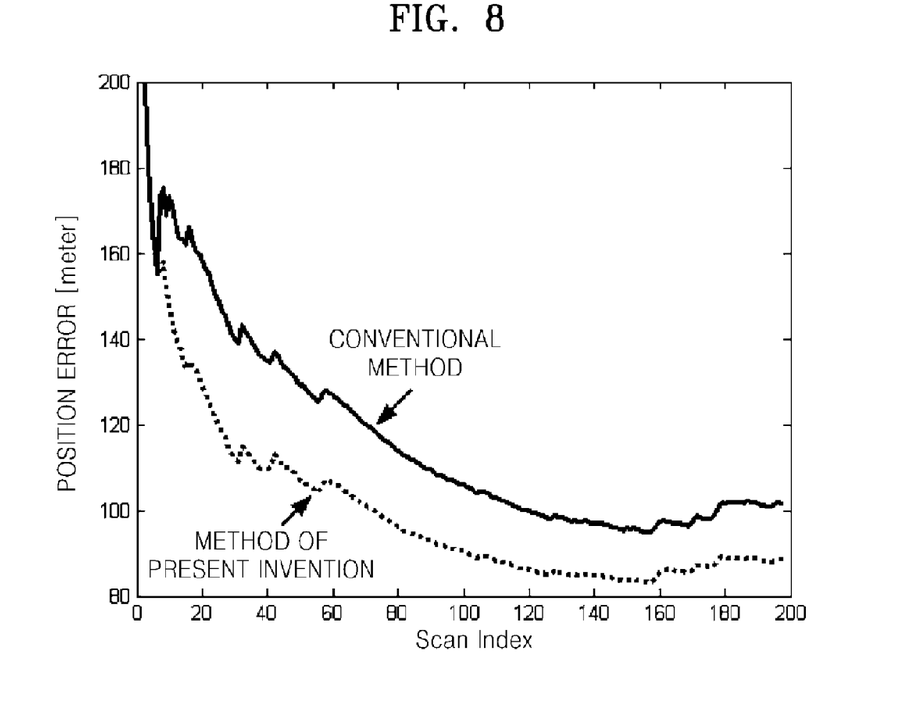
FIG. 8 is a graph illustrating position errors of a tracking filter using an updated α-β gain according to an embodiment of the present invention.

FIG. 8 is a graph illustrating position errors of a tracking filter using an updated α-β gain according to an embodiment of the present invention. Referring to FIG. 8, the RMS values of a position error of a tracking filter using an updated α-β gain according to the conventional method and according to the current embodiment are compared.

FIG. 8 shows RMS errors with respect to the estimated values of a position and a velocity. The solid line indicates the RMS values with respect to the position errors of an ordinary α-β tracking filter. The dotted line indicates the RMS values with respect to the position errors of the α-β tracking filter according to the method of an embodiment of the present invention.

It can be determined that the α-β tracking filter according to an embodiment of the present invention provides a greatly improved position tracking performance compared to the ordinary α-β tracking filter.

The dotted line shows the position errors of a target by using the α-β tracking using the α-β gain update according to an embodiment of the present invention in terms of RMS values. The solid line shows the position errors of a target, in terms of RMS values, when the target is tracked by using the α-β gain at a nominal point, which is the conventional method.

Figure 9:
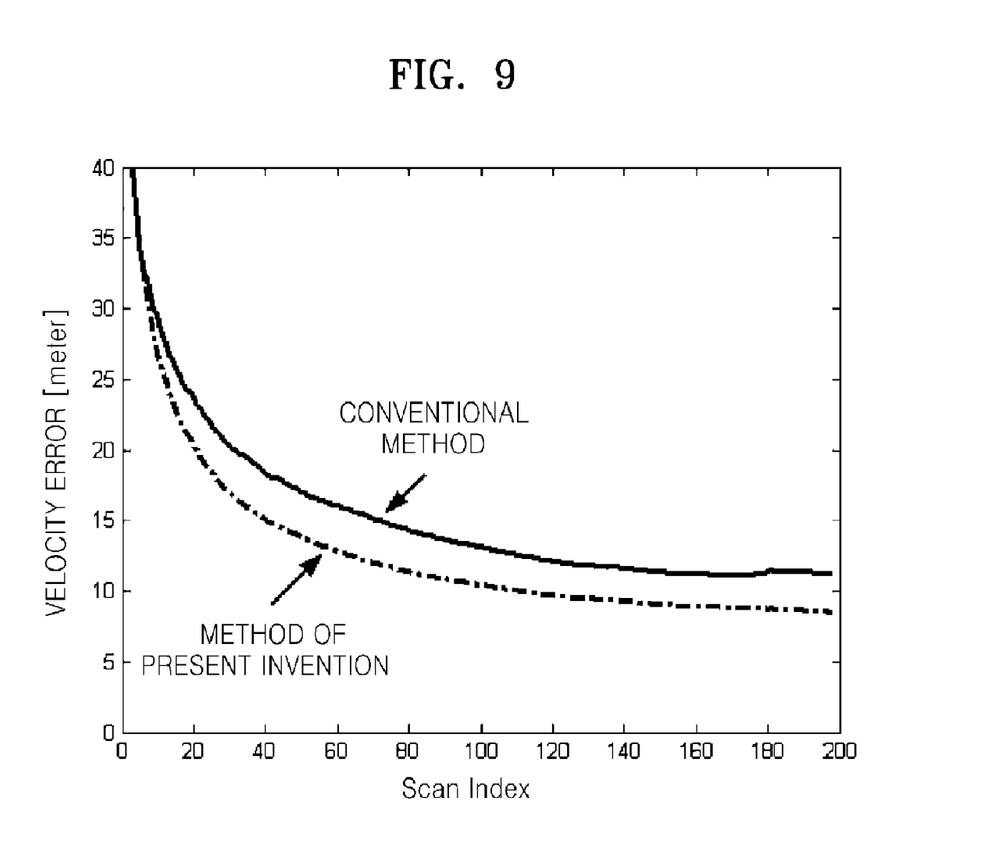
FIG. 9 is a graph illustrating velocity errors of a tracking filter using an updated α-β gain according to an embodiment of the present invention.

FIG. 9 is a graph illustrating velocity errors of a tracking filter using an updated α-β gain according to an embodiment of the present invention.

Referring to FIG. 9, the RMS values of a velocity error of a tracking filter using an updated α-β gain according to the conventional method and according to the current embodiment are compared.

FIG. 9 shows RMS errors with respect to the estimated values of a position and a speed. The solid line indicates the RMS values with respect to the velocity errors of an ordinary α-β tracking filter. The dotted line indicates the RMS values with respect to the velocity errors of the α-β tracking filter according to the method of an embodiment of the present invention.

The dotted line shows the velocity estimation errors of a target by using the α-β tracking using the α-β gain update according to an embodiment of the present invention in terms of RMS values. The solid line shows the velocity estimation errors of a target, in terms of RMS values, when the target is tracked by using the α-β gain at a nominal point, which is the conventional method.

It can be determined that the α-β tracking filter according to an embodiment of the present invention provides a greatly improved velocity tracking performance compared to the ordinary α-β tracking filter.

According to the present invention as described above, the gain of a tracking filter in a tracking apparatus using a radar-measured value is updated according to changes in the characteristic of a measurement error, thereby providing an improved tracking performance.

Accordingly, the present invention can be used in a variety of radar systems, including those for military purposes, those for guidance and control of navigation of ships in ports, and those for avoiding collisions of planes, ships and vehicles.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

The present invention provides a radar tracking apparatus and method in which when tracking of an object is performed by using a radar-measured value, the gain of a tracking filter is updated by considering changes in the characteristic of errors in the radar-measured value, thereby providing improved performance.

The invention claimed is:

1. A radar tracking apparatus comprising an α-β tracking filter, wherein the α-β tracking filter comprises:
a tracking index unit calculating a tracking index for obtaining α and β filter gains of an α-β tracking filter, based on changes in the measurement error covariance of a radar-measured value that occur when the measured value of target is converted from a polar coordinate system to a rectangular coordinate system; and
a filter gain update unit calculating variations of α and β filter gains, based on the partial differential coefficient of the changing rate of the α and β filter gains with respect to the changing rate of the tracking index and the variations of the tracking index and updating the α and β filter gains.

2. The radar tracking apparatus of claim 1, wherein changes in the measurement error covariance of the radar-measured value are expressed based on a function of the standard deviation of radar measurement errors.

3. The radar tracking apparatus of claim 1, wherein the tracking index is in proportion to proportional values of the standard deviation of a process error of a motion model of the tracking with respect to the standard deviation of the radar-measured value and discrete intervals.

4. The radar tracking apparatus of claim 1, wherein the tracking index is:

$$\lambda_k = \frac{\sigma_v}{\sigma_{w,k}} T^2$$

where $\sigma_{w,k}$ is the standard deviation of a radar measurement error at a k-th scan, $\sigma_v$ is the standard deviation of a process error of the motion model of the tracking, and T is a discrete interval.

5. A radar tracking method using an α-β tracking filter, the method comprising:
calculating a tracking index for obtaining α and β filter gains of an α-β tracking filter, based on changes in the measurement error covariance of a radar-measured value that occur when the measured value of target is converted from a polar coordinate system to a rectangular coordinate system; and
calculating the variations of α and β filter gains, based on the partial differential coefficient of the changing rate of the α and β filter gains with respect to the changing rate of the tracking index and the variations of the tracking index and updating the α and β filter gains.

6. The method of claim 5, wherein changes in the measurement error covariance of the radar-measured value are expressed based on a function of the standard deviation of radar measurement errors.

7. A computer readable recording medium having embodied thereon a computer program for executing the method of any one of claim 6.

8. A computer readable recording medium having embodied thereon a computer program for executing the method of any one of claim 5.

* * * * *